United States Patent [19]
Cier

[11] 3,755,155
[45] Aug. 28, 1973

[54] SEPARATION OF AROMATICS FROM HYDROCARBON STREAMS

[75] Inventor: Harry E. Cier, Baytown, Tex.

[73] Assignee: Esso Research and Engineering Company, Linden, N.J.

[22] Filed: July 23, 1971

[21] Appl. No.: 165,599

[52] U.S. Cl............ 208/331, 208/321, 260/674 SE
[51] Int. Cl............................................. C10g 21/18
[58] Field of Search........................... 208/336, 321; 260/674 SE

[56] References Cited
UNITED STATES PATENTS

| | | | |
|---|---|---|---|
| 3,565,965 | 2/1971 | Walker et al................. | 260/674 SE |
| 3,280,025 | 10/1966 | Poe et al...................... | 208/322 |
| 2,842,604 | 7/1958 | Waals et al................... | 260/674 SE |
| 2,838,583 | 6/1958 | Schneider..................... | 260/674 SE |
| 2,879,313 | 3/1959 | Scott et al..................... | 260/669 |

Primary Examiner—Herbert Levine
Attorney—Thomas B. McCulloch et al.

[57] ABSTRACT

Aromatic compounds may be separated from paraffin-aromatic mixtures by using a solvent consisting of a solution of an aromatic dissolved in the same aromatic in its protonated form with aluminum chloride, [ArH] [$Al_2Cl_7$], wherein a liquid paraffinic phase and a liquid aromatic phase are formed, separating the phases and adding HCl to the aromatic phase to react with the solvent and adjusting the temperature to form a solid phase having the following formula:

[ArH] [$AlCl_4$]

which then may be separated from the aromatic compounds present in the mixture. The aromatic identified as Ar in the above formula is mesitylene, isodurene, pentamethylbenzene, hexamethylbenzene or polynuclear aromatics more basic than the mononuclear aromatic. [ArH] [$AlCl_4$] may be used as the solvent in a preferred mode.

14 Claims, 2 Drawing Figures

PATENTED AUG 28 1973          3,755,155

INVENTOR.
HARRY E. CIER,
BY
ATTORNEY.

SEPARATION OF AROMATICS FROM HYDROCARBON STREAMS

BACKGROUND OF THE INVENTION

1. Field of the Invention

The present invention is directed to a process for separating aromatic compounds from paraffin-aromatic mixtures by solvent extraction. More specifically, the present invention involves the use of a specific solvent consisting of a solution of an aromatic dissolved in the the same aromatic in its protonated form with aluminum chloride having the formula:

$$Ar + [ArH] [Al_2Cl_7]$$

in which the aromatic compounds in the mixture form an aromatic phase. In its most specific aspects the invention is directed to recovering the solvent by adding HCl to the aromatic phase after it is separated from the paraffinic phase and recovering a solid having the formula:

$$[ArH] [AlCl_4]$$

which may then be reused and recycled.

2. Description of the Prior Art

The following listed U. S. Patents were considered in connection with this invention:

| | |
|---|---|
| 2,356,095 | 2,953,589 |
| 2,481,843 | 3,101,246 |
| 2,638,441 | 3,175,018 |
| 2,726,138 | 3,280,025 |
| 2,810,002 | 3,347,948 |
| 2,830,105 | 3,359,341 |
| 2,831,040 | 3,425,797 |
| 2,833,836 | 3,427,362 |
| 2,838,583 | 3,440,296 |
| 2,842,604 | 3,467,725 |
| 2,848,517 | 3,493,627 |
| 2,848,518 | 3,499,946 |
| 2,879,313 | 3,515,768 |
| 2,888,496 | 3,517,079 |
| 2,914,585 | 3,517,081 |
| 2,945,911 | 3,518,322 |

While it has been known in the prior art to use HCl as part of the complex, none of the foregoing art teaches the formation of a solid phase with the concomitant formation of two liquid phases and separation of the phases for recovery of aromatic products. Also, while the prior art teaches the separation of the paraffinic hydrocarbons from the aromatic hydrocarbons, none of the prior art teaches the separation of a solid solvent phase for recovery of the desired aromatic hydrocarbons from the rich extract solutions discharging from the extraction tower. The present invention is, therefore, new, useful and unobvious.

SUMMARY OF THE INVENTION

The present invention is directed to a process for separating aromatic compounds from paraffin-aromatic mixtures wherein a particular solvent is used which can be recovered and recycled. The solvent used consists of a solution of an aromatic, which is at least as basic as any of the aromatic compounds to be separated from the paraffin-aromatic mixture, dissolved in the same aromatic in its protonated form with aluminum chloride and thus having the structure:

$$[ArH]^+ [Al_2Cl_7]^-$$

This solvent has the capability to dissolve several mols of aromatic in what may be termed a solvation shell. Paraffins are inert and have very low solubility in this protonated solvent and hence two liquid phases form. A paraffinic phase may be separated from the aromatic phase. To recover the solvent it has been found according to this invention that the aromatic phase may be treated with hydrogen chloride at a pressure and temperature such that 1 mol of hydrogen chloride together with the equal molar aromatic and protonated aromatic will form 2 mols of a product having the following formula:

$$[ArH] [AlCl_4]$$

At the operating temperatures (i.e., the temperature of treating with HCl) this product is a solid and precipitates from the remaining aromatic compounds. Separation may be accomplished by any means wherein the liquid and solid are separated such as filtration or centrifugation. The filtrate is the desired aromatic product containing only very small amounts of dissolved solvent. The resulting extract from a water wash of the filtrate is a high purity aromatic product. If there are mixtures of aromatics, such as $C_6$, $C_7$, and $C_8$ aromatic compounds, these may be separated by simple distillation. The solid product may be recycled by heating and reducing the pressure to reverse the reaction wherein the hydrogen chloride is removed and recycled with the production of the solvent solution which may likewise be recycled.

VARIABLES OF THE INVENTION

The extraction of a mixture of paraffins and aromatics is suitably carried out at temperatures from about 0° to about 80° C. The temperature at which HCl is added to form the solid (when HCl is used) is from about −80° C to about 20° C.

The aromatic hydrocarbon characterized as Ar is suitably mesitylene, isodurene, pentamethylbenzene, and hexamethylbenzene which may be characterized as polymethyl aromatic hydrocarbons more basic than the lower aromatic hydrocarbons on the feed mixture. The other trimethyl and tetramethyl benzenes are not as basic as the feed aromatic hydrocarbons.

Suitable feed mixtures which may be treated in accordance with this invention are benzene, toluene, and xylenes or mixtures thereof which for convenience is termed BTX which may include any or all the aromatic hydrocarbons in the mixture but which may be only one, such as a mixture of xylenes or one or two of them, and the corresponding paraffins and naphthenes. The aromatic hydrocarbons comprise about 10 wt. percent to about 90 percent by wt. of the feed. Other aromatic hydrocarbons and paraffins and/or naphthenes may be used such as those boiling from about 60° C (140° F) to about 200° C (400° F).

BRIEF DESCRIPTION OF THE DRAWING

The invention will be further illustrated by reference to the drawing representing preferred modes and embodiments in which.

DESCRIPTION OF THE DRAWING

Figure 1:
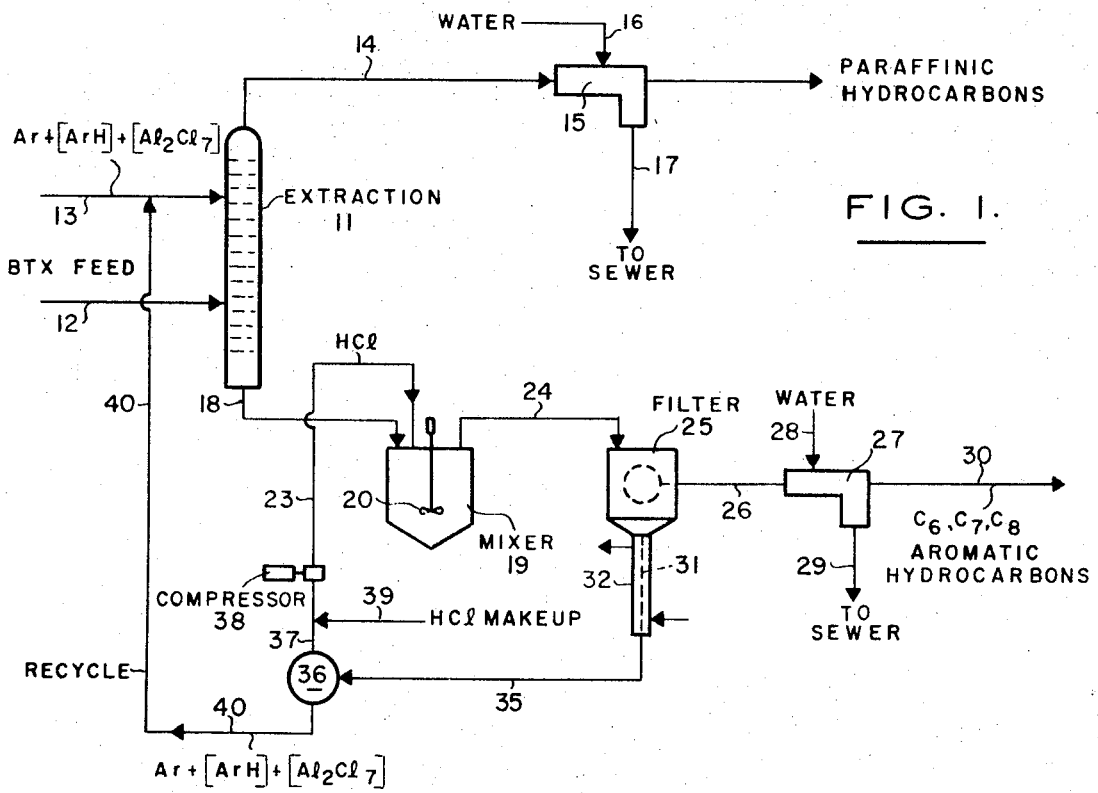
FIG. 1 represents a flow diagram of one mode of practicing the invention where HCl is used.

Referring now to the drawing, and particularly to FIG. 1, numeral 11 designates an extraction column into which is fed by line 12 a mixture of benzene, toluene and xylene and naphthenes and paraffins corresponding thereto. This fraction may boil in the range from about 60° C. to about 160° C. There is also fed into extraction column 11 by line 13 a suitable solvent which is a solution of an aromatic such as mesitylene and complexed [ArH] [$Al_2Cl_7$], Ar being mesitylene. In extraction column 11, which is suitably fitted with contacting means such as bellcap trays and is maintained at extraction temperatures, a raffinate phase and an extract phase are formed, the raffinate phase being withdrawn by line 14 and discharged thereby into settler 15, into which water is introduced by line 16, which causes a separation between the paraffinic and any naphthenic hydrocarbons and the water phase which will contain dissolved HCl and aluminum chloride. The water phase is withdrawn and discharged by line 17.

The extract phase is withdrawn from extraction column 11 by line 18 and introduced thereby into a mixing vessel 19 equipped with a suitable mixing means 20. HCl is introduced by line 23 and the HCl under the conditions of temperature and pressure in vessel 19 form a solid phase. The solid phase is withdrawn with the unsolidified material by line 24 into a filtration zone 25, from whence there is withdrawn by line 26 filtrate which is treated with water in separation stage 27 introduced by line 28, which causes a separation of water from the $C_6$, $C_7$, and $C_8$ aromatic hydrocarbons. Any aluminum chloride and HCl is withdrawn in the water phase and discharged from zone 27 by line 29. The $C_6$, $C_7$, and $C_8$ hydrocarbons withdrawn by line 30 may be suitably distilled to recover benzene, toluene, and xylenes.

The solid phase in filtration zone 25 is withdrawn by line 31 surrounded by heating jacket 32 through which is circulated a suitable heating fluid to liquefy the solid phase which is discharged by line 35 into a drum 36 from whence HCl is withdrawn by line 37 by compressor 38 which connects to line 23. HCl makeup may be introduced by line 39. Withdrawing the HCl from drum 36 results in formation of the complex Ar+[ArH-][$Al_2Cl_7$] which is recycled to line 13 by line 40 for reuse in the process.

Figure 2:
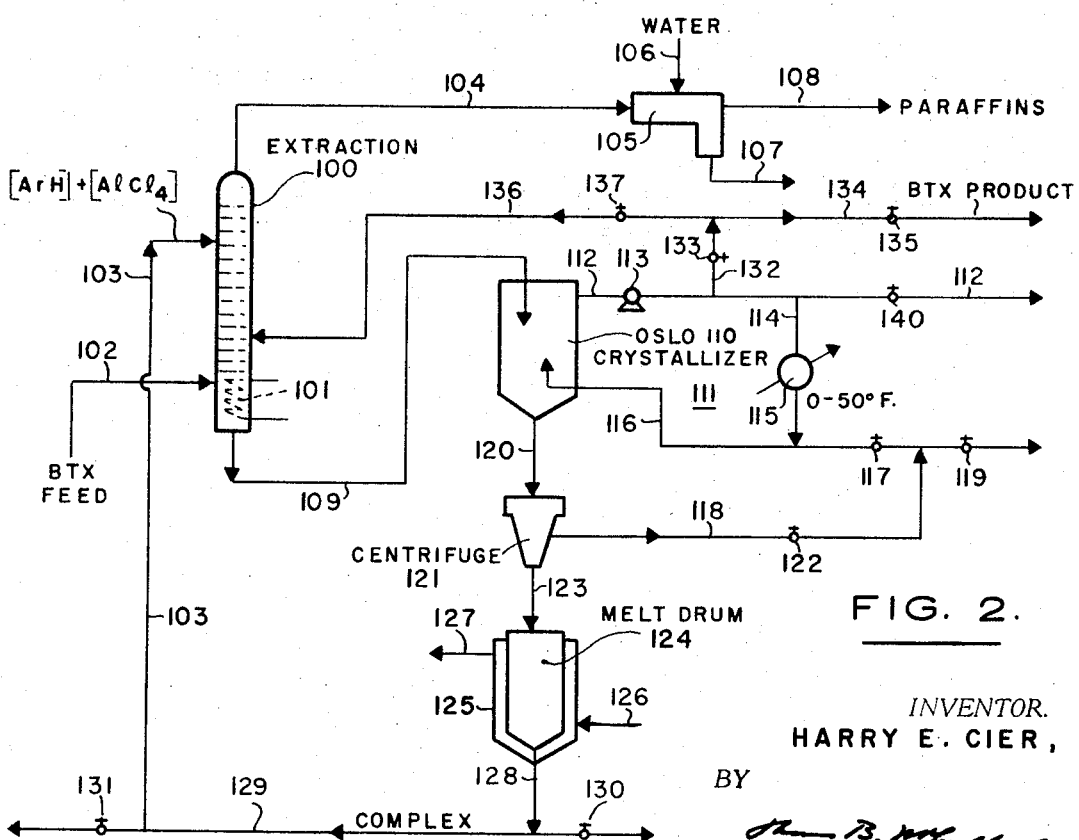
FIG. 2 represents a mode where HCl is not employed.

Referring now to FIG. 2, either the solvent [ArH-][$AlCl_4$] in extraction and recovery, the solvent [ArH-][$Al_2Cl_7$] in the extraction section, and [Ar][$AlCl_4$] in the recovery section may be used. In the first case, it is preferred that the solvents employed be mesitylene, hexamethylbenzene, isodurene, or pentamethylbenzene. In the second case, use of the above named aromatics in the form [ArH][$Al_2Cl_7$] with an extra mol of the aromatics may be used. After extraction the complex is converted to the $AlCl_4$- form by addition of HCl. The complex and aromatics are separated by crystallization, while the complex is in the $AlCl_4$- form.

Referring now to FIG. 2, numeral 100 designates an extraction tower provided with a temperature adjusting means 101 by way of which the temperature in the extraction tower 100 is adjusted. A suitable temperature is maintained in extraction tower 100 for extraction of the feed stream which is introduced by line 102 from a source not shown, while the preferred solvent [ArH-][$AlCl_4$] is introduced by line 103, and flows countercurrently to the feed stream introduced by line 102. The extraction tower 100 besides being equipped with temperature adjusting means is equipped with liquid liquid-contacting means such as bellcap trays and the like.

In the extraction tower 100 under suitable conditions there is formed a paraffinic phase which is removed by line 104 and is routed thereby into a separator 105 where it is contacted with water introduced by line 106 to wash the paraffin free of any aluminum chloride contained in any solvent which may be removed by line 104. The water containing the aluminum chloride discharges by line 107, while the paraffins are recovered by line 108.

The extract phase or solution is withdrawn by line 109 and discharged thereby into an Oslo crystallizer 110 which is cooled by a pump-around system indicated by the numeral 111 and comprised of line 112 containing a pump 113, line 114 containing a heat exchanger 115, and line 116. Line 116 contains a valve 117 and connects with line 118 which in turn forms part of pump-around system 111. The material in line 116 may be discharged by line 118 by opening valve 119 therein.

In the bottom of the Oslo crystallizer 110 there exists a phase of liquid aromatics and solids which are discharged by line 120 into a centrifuge 121 whereby a filtrate is removed by line 118 controlled by valve 122 and solids by line 123 which are discharged thereby into a melt drum 124 provided with a heating jacket 125 equipped with lines 126 and 127 for circulating heating fluid therethrough to melt the solid phase which comprises the complex [ArH][$AlCl_4$] which is removed by line 128 as a liquid and which discharges into line 129 and recycled to the extraction tower 100 by line 103. Line 129 is provided with a valve 130 for discharge of the liquid complex if desired and valve 131 for introducing make-up complex as may be required.

The recycle stream in the Oslo crystallizer 110 may have a branch line 132 provided with a valve 133 for discharge of the product by way of line 134 controlled by valve 135. In this case the product withdrawn through valve 135 is treated with water in a vessel similar to vessel 27 in FIG. 1 and the water and product withdrawn as described therein. Line 134 may connect by line 136 containing a valve 137 to extraction tower 100 for supplying reflux thereto.

It will be seen from the foregoing brief description that a rich extract solution is charged to an Oslo crystallizer system. A recycle stream of hydrocarbon is cooled to provide refrigeration. In this system a most interesting phase transformation occurs on crystallization. The solvent is removed by crystallization rather than is the solute. Hence, as a portion of the complex crystallizes out the remaining solution is supersaturated with respect to the desired product labeled BTX and therefore a proportionate amount of liquid hydrocarbon phase appears. This results in the presence of one solid and two liquid phases. The supernatant liquid may be drawn off from the crystallizer essentially free of complex by line 112 containing valve 140. The slurry of solid complex and liquid discharges to a centrifuge with the filtrate being recycled as described, while the solids are melted and returned to the extraction system.

Two stage crystallization may be used and the separated hydrocarbon from the first stage may have a higher concentration of nonaromatics than the total extract and, hence, this constitutes a reflux stream. The second stage hydrocarbon constitutes the BTX product and is purer than the total extract.

It will be clear from the description taken with the drawing (FIGS. 1 and 2 and particularly FIG. 2) that two types of extraction solvent may be used. The mol ratios of aromatic to HCl to AlCl$_3$ are 1:1:2 and 1:1:1 for the two solvents. The former may be referred to as a dimer solvent [ArH]$^+$[Al$_2$Cl$_7$]$^-$ and the latter may be referred to as a monomer solvent [ArH][AlCl$_4$]. The present invention allows the obtaining of new, useful and unobvious results and therefore is a step forward in the art.

It will be seen from the brief description taken with the drawing that a new and unobvious process for separating paraffinic hydrocarbons has been devised. The invention is unobvious since heretofore it was not known that such could be done.

The nature and objects of the present invention having been completely described and illustrated and the best mode contemplated set forth, what I wish to claim as new and useful and secure by letters Patent is:

1. A process for separating aromatic hydrocarbons from a paraffin-aromatic hydrocarbon mixture which comprises:
    contacting said mixture at a temperature wherein a liquid paraffinic hydrocarbon phase and a liquid aromatic hydrocarbon phase is formed with a solvent characterized by the formula:

$$Ar + [ArH]^+[Al_2Cl_7]^-$$

said solvent consisting of a solution of a different aromatic hydrocarbon (Ar) dissolved in the same different aromatic hydrocarbon in its protonated form with aluminum chloride and present in about equal molar amounts, said aromatic hydrocarbon (Ar) being at least as basic as any of the aromatic hydrocarbons to be separated from said paraffin-aromatic hydrocarbon mixture:
    separating said paraffinic hydrocarbon phase from said aromatic hydrocarbon phase;
    adding HCl to said aromatic hydrocarbon phase at a temperature wherein said HCl and solvent reacts in accordance with the following equation;

$$Ar + [ArH]^+[Al_2Cl_7]^- + HCl \rightarrow 2[ArH][AlCl_4]$$ said [ArH][AlCl$_4$] being a solid at said temperature; and separating said aromatic hydrocarbons from said solid [ArH][AlCl$_4$].

2. A process in accordance with claim 1 in which the mixtures are admixed at a temperature from about 0° to about 80° C.

3. A process in accordance with claim 1 in which Ar is mesitylene and in which the paraffin-aromatic hydrocarbon mixture comprises benzene, toluene, xylenes, and paraffins and naphthenes of similar boiling range.

4. A process in accordance with claim 1 in which the HCl is added at a temperature within the range of −80° C. to about 20° C.

5. A process in accordance with claim 1 in which separated aromatic hydrocarbons are treated with water.

6. A process in accordance with claim 1 which HCl is separated from the solid to form Ar + [ArH]$^+$[Al$_2$Cl$_7$]$^-$ which is recycled to be used as said solvent.

7. A process in accordance with claim 6 in which the HCl is separated by heating and pressure reduction.

8. A process in accordance with claim 6 in which the HCl is separated by pressure reduction.

9. A process in accordance with claim 7 in which the solid is heated to a temperature from about −80° C to about 80° C and the pressure is reduced from about at least one atmosphere to about 0.1 atmosphere.

10. A process for separating aromatic hydrocarbons from a paraffin-aromatic hydrocarbon mixture which comprises:
    contacting said mixture at a temperature wherein a liquid paraffinic hydrocarbon phase and a liquid aromatic hydrocarbon phase is formed with a liquid solvent characterized by the formula:

$$[ArH]^+[AlCl_4]^-$$

said solvent consisting of a different aromatic hydrocarbon in its protonated form with aluminum chloride and present in about equal molar amounts, said aromatic hydrocarbon (Ar) being at least as basic as any of the aromatic hydrocarbons to be separated from said mixture;
    separating said paraffinic hydrocarbon phase from said aromatic hydrocarbon phase containing said solvent;
    chilling said aromatic hydrocarbon phase containing said solvent to a temperature sufficient to form a solid solvent phase at said chilled temperature; and
    separating said solid solvent phase from said aromatic hydrocarbon phase.

11. A process in accordance with claim 10 in which the solid solvent phase is melted to obtain said solvent in its liquid form.

12. A process in accordance with claim 10 in which the different aromatic hydrocarbon is selected from the group consisting of mesitylene, isodurene, pentamethyl-benzene, and hexamethylbenzene.

13. A process in accordance with claim 11 in which the solvent is converted to the form Ar+[ArH][Al$_2$Cl$_7$] by removal of HCl therefrom before it contacts said mixture.

14. A process in accordance with claim 13 in which the aromatic hydrocarbon phase is treated with HCl.

* * * * *